United States Patent
Behzad et al.

(10) Patent No.: US 8,670,733 B2
(45) Date of Patent: *Mar. 11, 2014

(54) MULTIMODE COMMUNICATION DEVICE WITH SHARED SIGNAL PATH PROGRAMMABLE FILTER

(75) Inventors: Arya Behzad, Sunnyvale, CA (US); Ahmadreza Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,739

(22) Filed: Jan. 23, 2012

(65) Prior Publication Data

US 2012/0122518 A1    May 17, 2012

Related U.S. Application Data

(63) Continuation of application No. 12/559,691, filed on Sep. 15, 2009, now Pat. No. 8,103,229, which is a continuation of application No. 11/298,371, filed on Dec. 7, 2005, now Pat. No. 7,590,396.

(60) Provisional application No. 60/724,095, filed on Oct. 6, 2005.

(51) Int. Cl.
*H04B 17/02* (2006.01)
*H04B 7/08* (2006.01)
*H03D 5/00* (2006.01)
*H04B 1/16* (2006.01)
*H04M 1/00* (2006.01)

(52) U.S. Cl.
USPC ........... 455/132; 455/137; 455/307; 455/339; 455/552.1; 375/143; 375/152; 375/343; 375/350

(58) Field of Classification Search
USPC .............. 455/132–141, 306–307, 339, 552.1, 455/553.1, 143; 375/143, 152, 343, 350
See application file for complete search history.

(56) References Cited

U.S. PATENT DOCUMENTS

| 3,743,941 A | 7/1973 | Gans et al. |
| 5,640,694 A | 6/1997 | Milton, Jr. |

(Continued)

FOREIGN PATENT DOCUMENTS

| WO | 9931812 | 6/1999 |
| WO | 9934625 | 7/1999 |

OTHER PUBLICATIONS

European Search Report for European Patent Application Serial No. EP06014344.3, 7 pages, Feb. 2011.

*Primary Examiner* — Simon Nguyen
(74) *Attorney, Agent, or Firm* — Thomas|Horstemeyer, LLP.

(57) ABSTRACT

A multimode communication device with a shared signal path programmable filter and a method for utilizing a shared signal path programmable filter in a multimode communication device. Various aspects of the present invention comprise a first module adapted to receive a first communication signal (e.g., corresponding to a first communication protocol) and a second module adapted to receive a second communication signal (e.g., corresponding to a second communication protocol). A shared filter, communicatively coupled to the first and second modules, may be adapted to filter the first and/or second communication signals in accordance with a plurality of selectable sets of filter response characteristics (e.g., associated with the first and second communication protocols). A filter control module may be adapted to select a set of filter response characteristics from a plurality of such sets and program the shared filter to filter a communication signal in accordance with the selected set.

26 Claims, 9 Drawing Sheets

(56) References Cited

U.S. PATENT DOCUMENTS

| | | |
|---|---|---|
| 6,097,974 A | 8/2000 | Camp et al. |
| 6,256,511 B1 | 7/2001 | Brown et al. |
| 6,901,243 B2 | 5/2005 | Jayaraman et al. |
| 6,917,328 B2 | 7/2005 | Rabinowitz et al. |
| 7,106,816 B2 * | 9/2006 | Filipovic ............... 375/349 |
| 7,269,424 B2 | 9/2007 | Camp, Jr. |
| 7,372,927 B2 * | 5/2008 | Lee et al. ............... 375/350 |
| 7,526,052 B2 | 4/2009 | Davidoff et al. |
| 7,590,396 B2 * | 9/2009 | Behzad et al. ............ 455/132 |
| 7,676,211 B2 | 3/2010 | Martin et al. |
| 7,680,477 B2 * | 3/2010 | Yanduru et al. .......... 455/340 |
| 8,103,229 B2 | 1/2012 | Behzad et al. |
| 2002/0003844 A1 | 1/2002 | Doetsch et al. |
| 2003/0087622 A1 * | 5/2003 | Jayaraman et al. ........ 455/307 |
| 2003/0153322 A1 | 8/2003 | Burke et al. |
| 2004/0120421 A1 | 6/2004 | Filipovic |
| 2004/0142723 A1 * | 7/2004 | Shippee ................. 455/552.1 |
| 2004/0162023 A1 | 8/2004 | Cho |
| 2004/0209591 A1 * | 10/2004 | Martin et al. ........... 455/333 |
| 2005/0020298 A1 * | 1/2005 | Masumoto et al. ........ 455/552.1 |
| 2005/0032480 A1 | 2/2005 | Lee et al. |
| 2005/0119025 A1 * | 6/2005 | Mohindra et al. ........ 455/552.1 |
| 2006/0063493 A1 | 3/2006 | Yanduru et al. |
| 2006/0133551 A1 * | 6/2006 | Davidoff et al. .......... 375/350 |
| 2006/0178165 A1 | 8/2006 | Vassiliou et al. |
| 2006/0227887 A1 | 10/2006 | Li et al. |
| 2007/0082646 A1 | 4/2007 | Behzad et al. |
| 2007/0211786 A1 | 9/2007 | Shattil |

* cited by examiner

MULTIMODE COMMUNICATION DEVICE WITH SHARED SIGNAL PATH PROGRAMMABLE FILTER

CROSS-REFERENCE TO RELATED APPLICATIONS/INCORPORATION BY REFERENCE

This patent application is a continuation of U.S. patent application Ser. No. 12/559,691, filed on Sep. 15, 2009, now U.S. Pat. No. 8,103,229, which is a continuation of U.S. patent application Ser. No. 11/298,371, filed on Dec. 7, 2005, now U.S. Pat. No. 7,590,396, which makes reference to, claims priority to, and claims benefit from U.S. Provisional Patent Application Ser. No. 60/724,095, filed Oct. 6, 2005. The contents of the aforementioned patent applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Multimode communication devices (e.g., mobile communication devices) are continually increasing in popularity. Such communication devices include, for example and without limitation, network access points, cellular phones, paging devices, portable email devices and personal digital assistants with communication capability. Mobile communication devices, for example, provide the user with the capability to conduct communications while moving through a variety of environments.

Multimode communication devices typically have multiple independent radio circuits. For example, in an exemplary configuration, a multimode communication device may have a first independent transceiver for communicating with a first particular type of communication network (e.g., in accordance with a first communication protocol) and a second independent transceiver for communicating with a second particular type of communication network (e.g., in accordance with a second communication protocol). Each independent transceiver may, for example, comprise a plurality of filters and related circuitry that are specifically adapted for operation in accordance with a particular communication protocol. Thus, in particular operating scenarios, when the first independent transceiver is communicating, filters associated with the second independent transceiver are not utilized, and when the second independent transceiver is communicating, filters associated with the first independent transceiver are not utilized. Such a configuration and operation may be wasteful from a variety of perspectives (e.g., circuit size).

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the present invention provide a multimode communication device with a shared signal path programmable filter and a method for utilizing a shared signal path programmable filter in a multimode communication device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
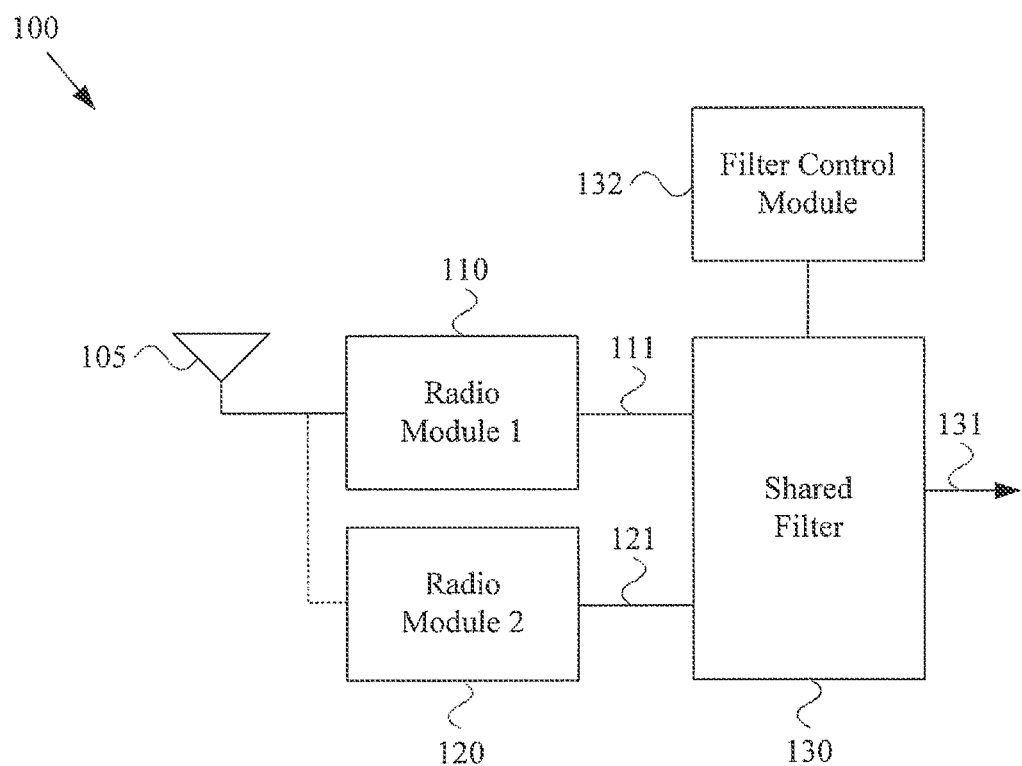
FIG. 1 is a diagram illustrating a portion of a first exemplary multimode communication device, in accordance with various aspects of the present invention.

FIG. 1 is a diagram illustrating a portion of a first exemplary multimode communication device 100, in accordance with various aspects of the present invention. The communication device 100 (and any of the exemplary communication devices discussed herein) may comprise characteristics of any of a variety of communication devices. The communication device 100 may, for example, comprise characteristics of a mobile communication device (e.g., cellular phone, paging device, portable email device, personal digital assistant, portable computer with mobile communication capability, etc.).

The communication device 100 may also, for example, comprise characteristics of a generally stationary communication device (e.g., wireless router, network access point, cellular base station, etc.).

The exemplary communication device 100 may comprise a first radio module 110 that is adapted to receive at least one communication signal through an antenna 105. The following discussion may generally discuss a received communication signal as a wireless signal (e.g., an RF signal). However, the received communication signal may comprise characteristics of any of a variety of signals associated with various communication media (e.g., a wire signal, RF signal, tethered optical signal, non-tethered optical signal, etc.). Accordingly, the first radio module 110 may comprise characteristics of any of a variety of radio hardware and/or software associated with such signals.

Additionally, as will be discussed later, the antenna 105 may correspond to one or more antennas. For example and without limitation the antenna 105 may correspond to a single antenna or may correspond to a multi-antenna configuration. A multi-antenna configuration may, for example, be utilized in a beam-forming configuration or in a Multiple-Input-Multiple-Output ("MIMO") configuration (e.g., in accordance with IEEE 802.11(n) multiple-antenna communications).

The first radio module 110 may be adapted to receive at least one communication signal communicated in accordance with any of a variety of communication protocols (e.g., wireless or wired computer network or telecommunication network protocols). For example and without limitation, the first radio module 110 may be adapted to receive communication signals communicated in accordance with any or all of GSM/GPRS/EDGE, CDMA, WCDMA/UMTS, TDMA, PDC, DVB-H, IEEE 802.11, IEEE 802.15, IEEE 802.16, Bluetooth, Zigbee, UltraWideBand, Ethernet, Token Ring, standard and/or propriety protocols, etc.

The first radio module 110 may, for example, be adapted to receive a first communication signal that is characterized by a first set of communication signal characteristics. Such a first set of communication signal characteristics may, for example, comprise frequency or frequency range characteristics, modulation characteristics, characteristics associated with a particular communication protocol, encoding characteristics, etc. For example, the first set of communication signal characteristics may correspond to a communication signal communicated in accordance with one of the communication standards mentioned above. In a non-limiting exemplary scenario, the first radio module 110 may be adapted to receive a Bluetooth signal. In another non-limiting exemplary scenario, the first radio module 110 may be adapted to receive a WLAN signal (or both Bluetooth and WLAN signals). In another non-limiting exemplary scenario, the first radio module 110 may be adapted to receive and process a cellular telephony signal (e.g., a GSM or CDMA signal).

The first radio module 110 may then output at least one received communication signal 111. As will be discussed later in more detail, the first radio module 110 may, depending on the configuration, output a received RF communication signal or an IF communication signal. Also for example, the first radio module 110 may output a baseband communication signal (e.g., a digital baseband signal).

In general, the first radio module 110 may be adapted to receive at least one communication signal (e.g., corresponding to a first communication protocol). Accordingly, the scope of various aspects of the present invention should not be limited by characteristics related to any particular type of communication device, communication medium, communication signal or communication protocol.

The exemplary communication device 100 may also comprise a second radio module 120 that is adapted to receive, at least one communication signal through an antenna. The second radio module 120 may, for example and without limitation, share any or all characteristics with the first radio module 110 discussed previously.

For example and without limitation, the second radio module 120 may be adapted to receive communication signals through an antenna 105. Though the exemplary communication device 100 shows the first radio module 110 and the second radio module 120 sharing an antenna 105, the first and second radio modules 110, 120 may each be associated with one or more different respective antennas. Such antennas may, for example, be singular or may be configured in a multi-antenna configuration.

Also for example, the second radio module 120 may be adapted to receive a communication signal associated with any of a variety of communication media and/or in accordance with any of a variety of communication protocols.

In a non-limiting exemplary scenario, the first radio module 110 may be adapted to receive a Bluetooth signal, and the second radio module 120 may be adapted to receive a WLAN signal (or both Bluetooth and WLAN signals). In another non-limiting exemplary scenario, the first radio module 110 may be adapted to receive a cellular telephony signal (e.g., a GSM or CDMA signal), and the second radio module 120 may be adapted to receive a wireless computer network signal. In yet another non-limiting exemplary scenario, the first radio module 110 may be adapted to receive a CDMA signal, and the second radio module 120 may be adapted to receive a GSM signal.

The second radio module 120 may, for example, be adapted to receive a communication signal characterized by a second set of communication signal characteristics. Such a second set of communication signal characteristics may, for example, comprise frequency or frequency range characteristics, modulation characteristics, characteristics associated with a particular communication protocol, encoding characteristics, etc. For example, the second set of communication signal characteristics may correspond to a communication signal communicated in accordance with one of the communication standards mentioned previously.

In a non-limiting exemplary scenario, the first radio module 110 may be adapted to receive a communication signal in a first frequency band, and the second radio module 120 may be adapted to receive a communication signal in a second frequency band. The first and second frequency bands may, for example, be overlapping or may be completely different from each other.

The exemplary communication device 100 illustrated in FIG. 1 and various exemplary communication devices illustrated and discussed herein are generally illustrated with first and second radio modules. Such two-radio module configurations are presented for illustrative clarity and should not limit the scope of various aspects of the present invention to configurations having any particular number of radio modules. Various aspects of the present invention are readily extensible to configurations comprising more than two radio modules (e.g., three, four or N-radio module configurations, where N is a positive integer).

Figure 2:
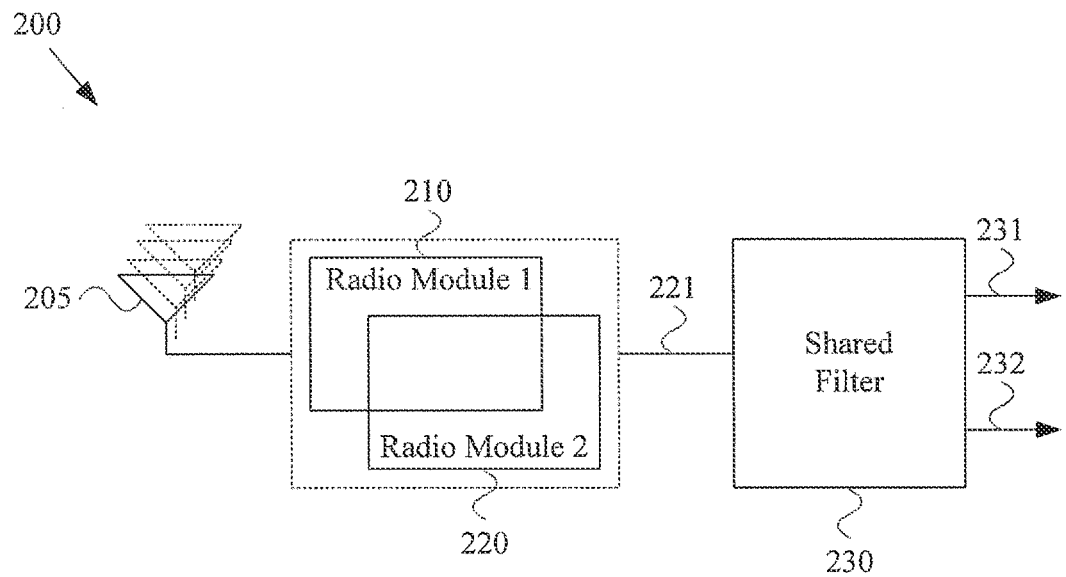
FIG. 2 is a diagram illustrating a portion of a second exemplary multimode communication device, in accordance with various aspects of the present invention.

Also note that though the first radio module 110 and second radio module 120 (and various other radio modules discussed herein) are illustrated as independent blocks, the first radio module 110 and the second radio module 120 may be completely independent from each other or may share various components. For example and without limitation, the first radio module 110 and the second radio module 120 may share various amplifier, mixing and frequency generating circuits. Such partial or full integration is illustrated in FIG. 2, which will be discussed later.

Additionally, depending on the configuration, the first radio module 110 and the second radio module 120 may receive respective communication signals concurrently or serially. Such concurrent or serial receiving will be discussed more with regard to the exemplary communication device configurations illustrated later. Accordingly, the scope of various aspects of the present invention should not be limited by characteristics of radio modules for concurrently or serially receiving respective communication signals.

Figure 7:
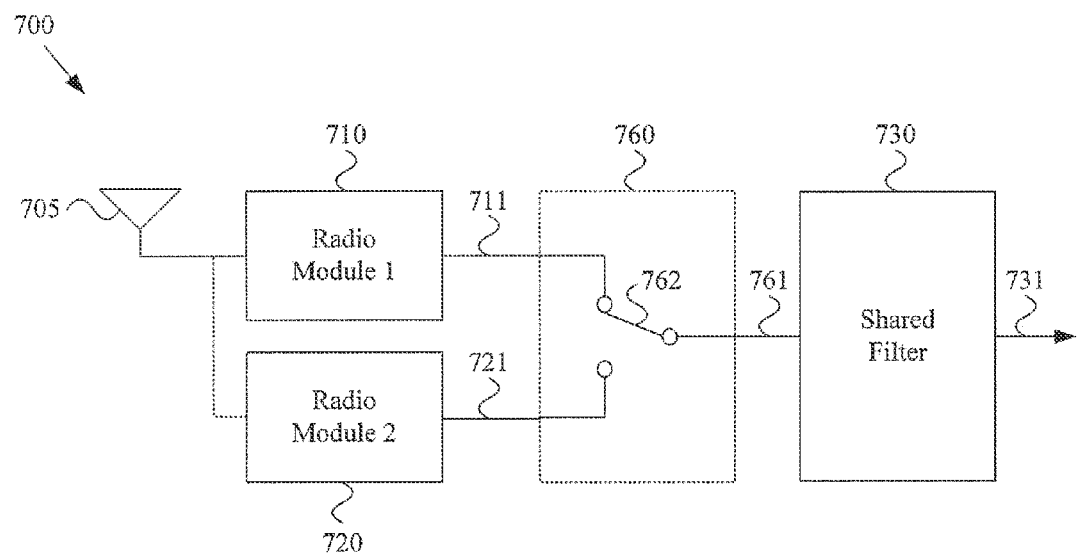
FIG. 7 is a diagram illustrating a portion of a seventh exemplary multimode communication device, in accordance with various aspects of the present invention.
Figure 8:
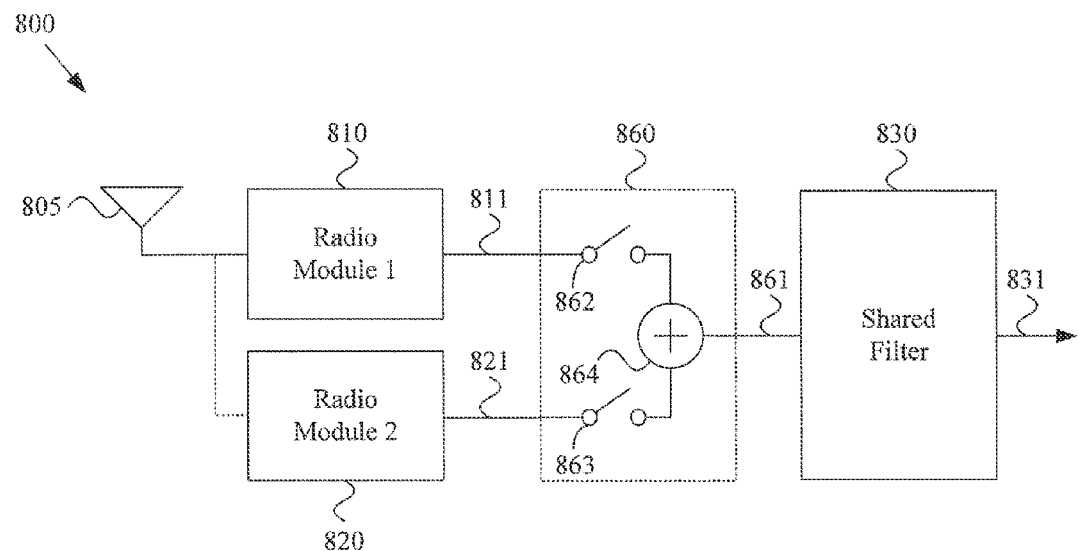
FIG. 8 is a diagram illustrating a portion of an eighth exemplary multimode communication device, in accordance with various aspects of the present invention.
Figure 9:
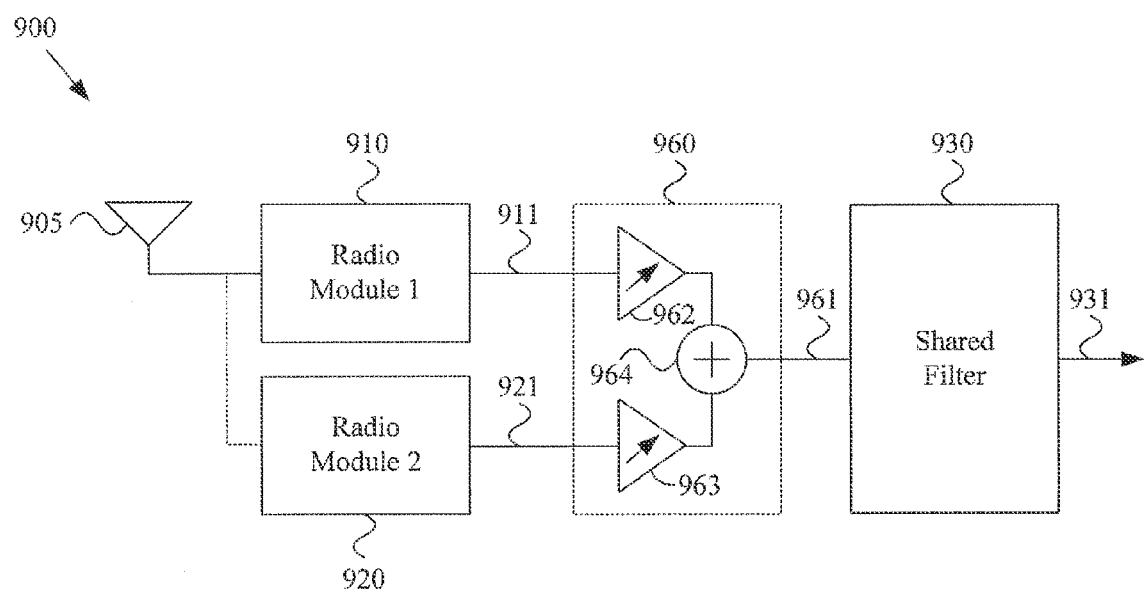
FIG. 9 is a diagram illustrating a portion of a ninth exemplary multimode communication device, in accordance with various aspects of the present invention.

The exemplary communication device 100 may also comprise a shared filter 130. The shared filter 130 may, for example, be communicatively coupled to the first radio module 110 and the second radio module 120. For example, the first radio module 110 may output a first received communication signal 111 to the filter 130, and the second radio module 120 may output a second received communication signal 121 to the filter 130. Such communicative coupling may, for example, be implemented through direct or indirect coupling. As illustrated in FIGS. 7-9, such communicative coupling may be implemented indirectly through various intermediate components (e.g., switches, signal combining circuitry, multiplexers, etc.).

The share filter 130 may be adapted to filter a communication signal in accordance with any of a variety of selectable (e.g., programmable) filter response characteristics. The shared filter 130 may, for example, be adapted to filter a communication signal received from at least one of the first radio module 110 and second radio module 120 (or other radio modules) in accordance with a selected one of a plurality of selectable sets of filter response characteristics. In a non-limiting exemplary scenario, a first of the plurality of selectable sets of filter response characteristics corresponds to a first communication protocol, and a second of the plurality of selectable sets of filter response characteristics corresponds to a second communication protocol.

The selectable (e.g., programmable) filter response characteristics may comprise any of a variety of selectable filter response characteristics. For example and without limitation, such filter response characteristics may comprise a filter center frequency. In a non-limiting exemplary scenario, a first set of filter response characteristics may comprise a first center frequency, and a second set of filter response characteristics may comprise a second center frequency. Also for example, such filter response characteristics may comprise a filter cut-off (or corner) frequency. In a non-limiting exemplary scenario, a first set of filter response characteristics may comprise a first cut-off frequency, and a second set of filter response characteristics may comprise a second cut-off frequency.

Additionally, for example, such filter response characteristics may comprise bandwidth. In a non-limiting exemplary scenario, a first set of filter response characteristics may comprise a first bandwidth, and a second set of filter response characteristics may comprise a second bandwidth. Further, for example, such filter response characteristics may comprise stopband attenuation. In a non-limiting exemplary scenario, a first set of filter response characteristics may comprise a first level of stopband attenuation, and a second set of filter response characteristics may comprise a second level of stopband attenuation. Still further for example, such filter response characteristics may comprise passband ripple. In a non-limiting exemplary scenario, a first set of filter response characteristics may comprise a first level of passband ripple, and a second set of filter response characteristics may comprise a second level of passband ripple.

In general, the selectable (e.g., programmable) filter response characteristics may comprise any of a variety of response characteristics associated with a filter. Accordingly, the scope of various aspects of the present invention should not be limited by any particular filter response characteristics.

As mentioned previously, the first radio module 110 and/or the second radio module 120 may be adapted to output respective RF communication signals, IF communication signals or baseband communication signals. Accordingly, the shared filter 130 may be adapted to filter any of such communication signal types. Non-limiting exemplary communication device configurations associated with such filtering will be presented in FIGS. 3-6.

The shared filter 130 may, for example, comprise characteristics of programmable analog filters. For example and without limitation, the shared filter 130 may be programmable (or adjustable) by switching various passive electrical components (e.g., resistors, capacitors, inductors, etc.) into and/or out of the filtering circuit. Such switching may, for example be implemented utilizing various types of switches (e.g., traditional semiconductor switches, Micro-Electro-Mechanical Switches ("MEMS"), etc.). For example, the shared filter 130 may comprise a switched array of passive components (e.g., one or more ladder networks). In such an exemplary configuration, a first switch configuration may correspond to a first of a plurality of selectable sets of filter response characteristics, and a second switch configuration may correspond to a second of a plurality of selectable sets of filter response characteristics.

Also for example, the shared filter 130 may be programmable (or adjustable) by switching between various filters of a switched array of filters. In such a configuration, one or more filters of the switched array of filters may be selected to achieve a desired overall filter response. In such an exemplary configuration, a first switch configuration may correspond to a first of a plurality of selectable sets of filter response characteristics, a second switch configuration may correspond to a second of a plurality of selectable sets of filter response characteristics, and a third switch configuration may correspond to a third of a plurality of selectable sets of filter response characteristics.

Further for example, the shared filter 130 may be programmable (or adjustable) by tuning one or more adjustable passive electrical components. Such adjustable passive electrical components may, for example, comprise characteristics of any of a variety of tunable passive components (e.g., tunable MOSFET resistors, tunable capacitors, etc.). In such a configuration, a first passive component tuning may correspond to a first of a plurality of selectable sets of filter response characteristics, and a second passive component tuning may correspond to a second of a plurality of selectable sets of filter response characteristics.

Still further for example, the shared filter 130 may be programmable (or adjustable) by adjusting timing of various signals. For example and without limitation, the shared filter 130 may utilize Active Charge Transport ("ACT") devices for controlling signal delay. In such a configuration, a first signal delay may correspond to a first of a plurality of selectable sets of filter response characteristics, a second signal delay may correspond to a second of a plurality of selectable sets of filter response characteristics, and a third signal delay may correspond to a third of a plurality of selectable sets of filter response characteristics.

The shared filter 130 may also, for example, comprise characteristics of various programmable digital filters. For example and without limitation, the shared filter 130 may comprise a plurality of taps with programmable coefficients. Further for example, the shared filter 130 may comprise an adjustable number of taps. Still further for example, the shared filter 130 may be reconfigurable between various filter configurations (e.g., between a Finite Impulse Response ("FIR") and an Infinite Impulse Response ("IIR") filter configuration). Non-limiting exemplary communication device configurations that comprise a digital filter will be presented later in FIGS. 5 and 6.

In general, the shared filter 130 may comprise characteristics of any of a variety of adjustable (e.g., programmable) filters. Accordingly, the scope of various aspects of the present invention should not be limited by characteristics of any particular type of adjustable filter.

The exemplary communication device 100 may comprise a filter control module 132. The filter control module 132 may, for example, be adapted to select one of a plurality of sets of filter response characteristics and direct the shared filter 130 to filter a communication signal in accordance with the selected set of filter response characteristics.

The filter control module 132 is illustrated in FIG. 1 as separate from the filter 130. Such independence is presented for the sake of illustrative clarity and is by no means necessary. For example, the filter control module 132 may alternatively be partially or fully integrated with the shared filter 130. For example and without limitation, various filter control functions may be performed by the shared filter 130, and various other filter control functions may be performed by a processor executing software instructions and/or by a state machine. Other exemplary communication device configurations illustrated in FIGS. 2-9 integrate the functionality of the filter control module 132 with the shared filter 130, but such integration is merely exemplary.

The filter control module 132 may direct operation of the shared filter 130 in any of a variety of manners. For example and without limitation, the filter control module 132 may comprise a memory device storing programmable filter switch settings that correspond to particular selectable sets of filter response characteristics. Upon selection of a particular set of filter response characteristics (e.g., selecting a particular set of filter response characteristics corresponding to a particular type of received communication signal), the corresponding filter switch settings may be applied to switching devices of the shared filter 130. Such switch settings may, for example, correspond to a particular set of passive components, sub-filters or other filter components that govern response characteristics of the shared filter 130.

Also for example, the filter control module 132 may comprise a memory device storing information utilized to tune passive components of the shared filter 130. Upon selection of a particular set of filter response characteristics, the corresponding passive component tuning information may be applied to tunable passive devices of the shared filter 130. Additionally for example, the filter control module 132 may store information related to digital filter tap coefficients. Upon selection of a particular set of filter response characteristics, the corresponding filter tap coefficients may be applied to taps of the shared filter 130. Further for example, the filter control module 132 may store filter configuration information. Upon selection of a particular set of filter response characteristics, the corresponding filter configuration information may be applied to modify configuration of the shared filter 130.

The filter control module 132 may be adapted to select a set of filter response characteristics in any of a variety of manners. For example and without limitation, the filter control module 132 may be adapted to select one of a plurality of selectable sets of filter response characteristics based, at least in part, on an indication that a received communication signal corresponds to a particular communication protocol. Also for example, the filter control module 132 may be adapted to select one of a plurality of selectable sets of filter response characteristics based, at least in part, on a decision to determine whether a received communication signal corresponds to a particular communication protocol.

Further for example, the filter control module 132 may be adapted to select one of a plurality of selectable sets of filter response characteristics based, at least in part, on a predefined communication schedule or operating profile. Still further for example, the filter control module 132 may be adapted to select one of a plurality of selectable sets of filter response characteristics based, at least in part, on a user request or a request received from another communication system (e.g., a communication network controller, access point or other communication device).

In general, the filter control module 132 may be adapted to select a set of filter response characteristics and direct the shared filter 130 to filter a communication signal in accordance with the selected filter response characteristics. Accordingly, the scope of various aspects of the present invention should not be limited by characteristics of any particular manner of selecting filter response characteristics or any particular manner of controlling a filter to perform filtering in accordance with selected filter response characteristics.

Various characteristics of the exemplary communication device 100 (and other communication devices discussed herein, by analogy) will now be presented by way of non-limiting example.

In a first non-limiting exemplary scenario, the exemplary communication device 100 may comprise a first communication signal pathway (e.g., comprising the first radio module 110 and the shared filter 130) through which communication signals corresponding to a first communication protocol are received and processed. The communication device 100 may also comprise a second communication signal pathway (e.g., comprising the second radio module 120 and the shared filter 130) through which communication signals corresponding to a second communication protocol, different from the first communication protocol, are received and processed. The first communication signal pathway and second communication signal pathway may, for example and without limitation, partially differ but share the shared filter 130.

Continuing the exemplary scenario, the shared filter 130 may, when processing a communication signal associated with the first communication signal pathway, filter the communication signal in accordance with filter response characteristics associated with the first communication protocol. The shared filter 130 may also, when processing a communication signal associated with the second communication signal pathway, filter the communication signal in accordance with filter response characteristics associated with the second communication protocol. In an example including simultaneous processing of communication signals associated with the first and second communication signal pathways, the shared filter 130 may process a combined communication signal in accordance with filter response characteristics associated with both the first and second communication protocols.

FIG. 2 is a diagram illustrating a portion of a second exemplary multimode communication device 200, in accordance with various aspects of the present invention. The exemplary communication device 200 may, for example and without limitation, share any or all characteristics with the exemplary communication device 100 illustrated in FIG. 1 and discussed previously.

The exemplary communication device 200 may comprise a first radio module 210 and a second radio module 220. For example and without limitation, the first radio module 210 and second radio module 220 may share any or all characteristics with the first radio module 110 and second radio module 120, respectively, discussed previously with regard to FIG. 1.

As discussed previously, a communication device may comprise one or a plurality of antennas. Such a plurality of antennas is illustrated in FIG. 2 by the dashed line antenna(s) 205 of the communication device 200. Such antennas 205 may, for example and without limitation, be utilized in a beam-forming configuration or a MIMO configuration.

Also as discussed previously, a first radio module and a second radio module may be partially or fully integrated. As illustrated by the overlapping boxes in FIG. 2, the first radio module 210 and the second radio module 220 may share at least a portion of their components. Such shared components may, for example, comprise characteristics of hardware and/or software components. Such shared components may, for example, be utilized by the first radio module 210 during a first time interval and utilized by the second radio module 220 during a second time interval. In a non-limiting exemplary scenario, such shared components may be utilized by the first and second radio modules 210, 220 to process multiple received signals pseudo-simultaneously in a time-multiplexed manner.

The first radio module 210 or the second radio module 220 may output a received communication signal 211. As illustrated in FIG. 1, each radio module of a communication device may output a respective received communication signal. As an exemplary alternative to such independent respective output signals, the first radio module 210 and second radio module 220 are illustrated as outputting a single received communication signal 211. Such a communication signal 211 may correspond to an output of the first radio module 210, an output of the second radio module 220, or in various exemplary scenarios, outputs of both the first radio module 210 and the second radio module 220 combined.

The exemplary communication device 200 may also comprise a shared filter 230 communicatively coupled to the first radio module 210 and the second radio module 220. The shared filter 230 may, for example and without limitation, share any or all characteristics with the shared filter 130 discussed previously with regard to FIG. 1. For example, the shared filter 230 may be adapted to receive at least one communication signal 211 from the first radio module 210 and/or second radio module 220 and filter such a received communication signal in accordance with any of a variety of selectable (e.g., programmable) filter response characteristics.

The shared filter 230 is illustrated outputting a first filtered signal 231 corresponding to a communication signal received from the first radio module 210 and a second filtered signal 232 corresponding to a communication signal received from the second radio module 220. Such output signal separation is merely exemplary and shown as an alternative to the shared filter 130 of FIG. 1, which is illustrated outputting a single filtered communication signal 131, which may correspond to either the first radio module 110, second radio module 120, or both first and second radio modules 110, 120 concurrently.

Figure 3:
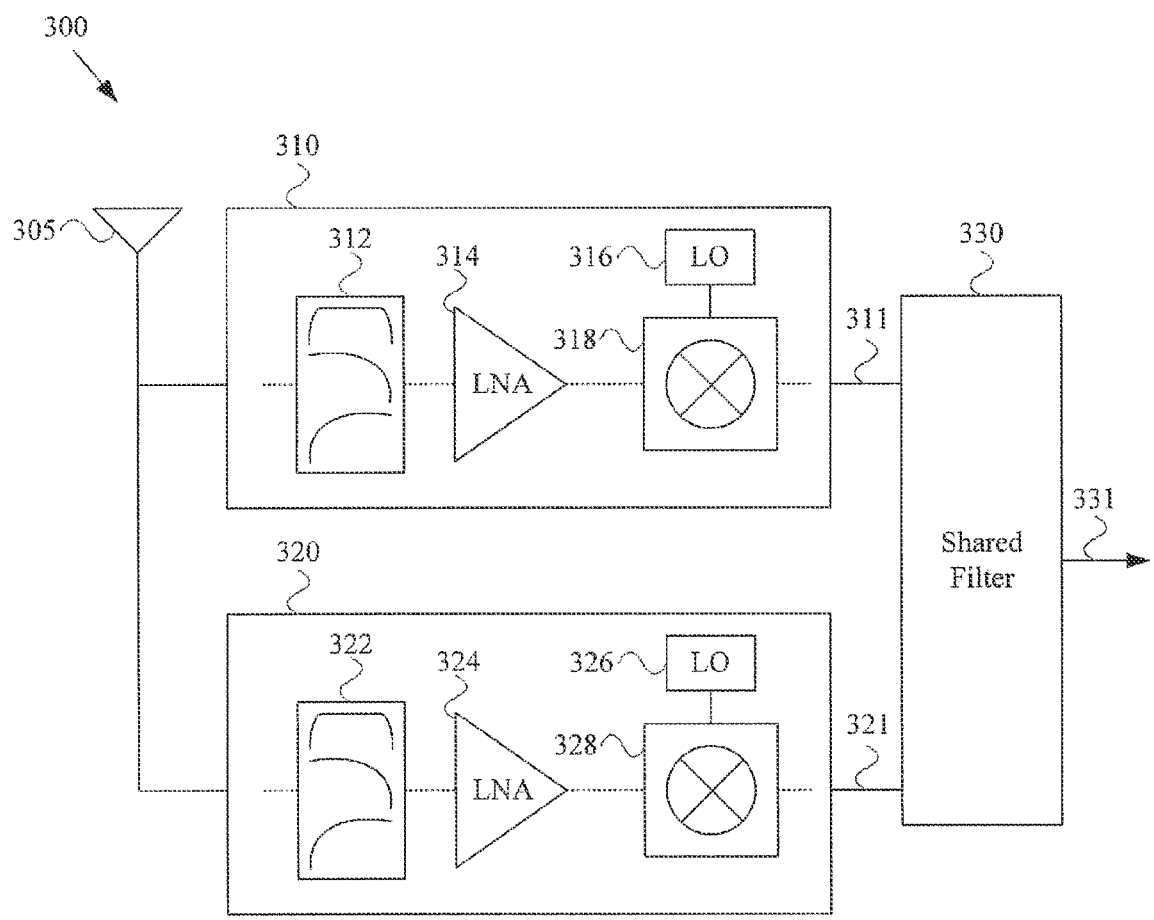
FIG. 3 is a diagram illustrating a portion of a third exemplary multimode communication device, in accordance with various aspects of the present invention.

FIG. 3 is a diagram illustrating a portion of a third exemplary multimode communication device 300, in accordance with various aspects of the present invention. The exemplary communication device 300 may, for example and without limitation, share any or all characteristics with the exemplary communication devices 100, 200 illustrated in FIGS. 1-2 and discussed previously. As discussed previously, a shared filter may be utilized to filter received communication signals at IF frequencies. FIG. 3 illustrates an exemplary configuration utilizing such filtering.

The exemplary communication device 300 comprises a first radio module 310, a second radio module 320 and a shared filter 330. Each of the first and second radio modules 310, 320 may receive a communication signal from at least one antenna 305. For example and without limitation, the first and second radio modules 310, 320 may share any or all characteristics with the first radio modules 110, 210 and second radio modules 120, 220 discussed previously with regard to FIGS. 1-2.

The first radio module 310 may comprise a filter 312 and low noise amplifier 314 to receive a radio frequency ("RF") communication signal. The first radio module 310 may also comprise a mixer 318 and local oscillator 316 adapted to convert the received RF communication signal to an intermediate frequency ("IF") communication signal. The first radio module 310 may then output the IF communication signal 311 to the shared filter 330.

The second radio module 320 may comprise a filter 322 and low noise amplifier 324 to receive an RF communication signal. The second radio module 320 may also comprise a mixer 328 and local oscillator 326 adapted to convert the received RF communication signal to an IF communication signal. The second radio module 320 may then output the IF communication signal 321 to the shared filter 330.

The shared filter 330 may then receive and filter the IF communication signal(s) 311, 321 received from the first and/or second radio modules 310, 320. The shared filter 330 may, for example and without limitation, share any or all characteristics with the shared filters 130, 230 discussed previously with regard to FIGS. 1-2.

Figure 4:
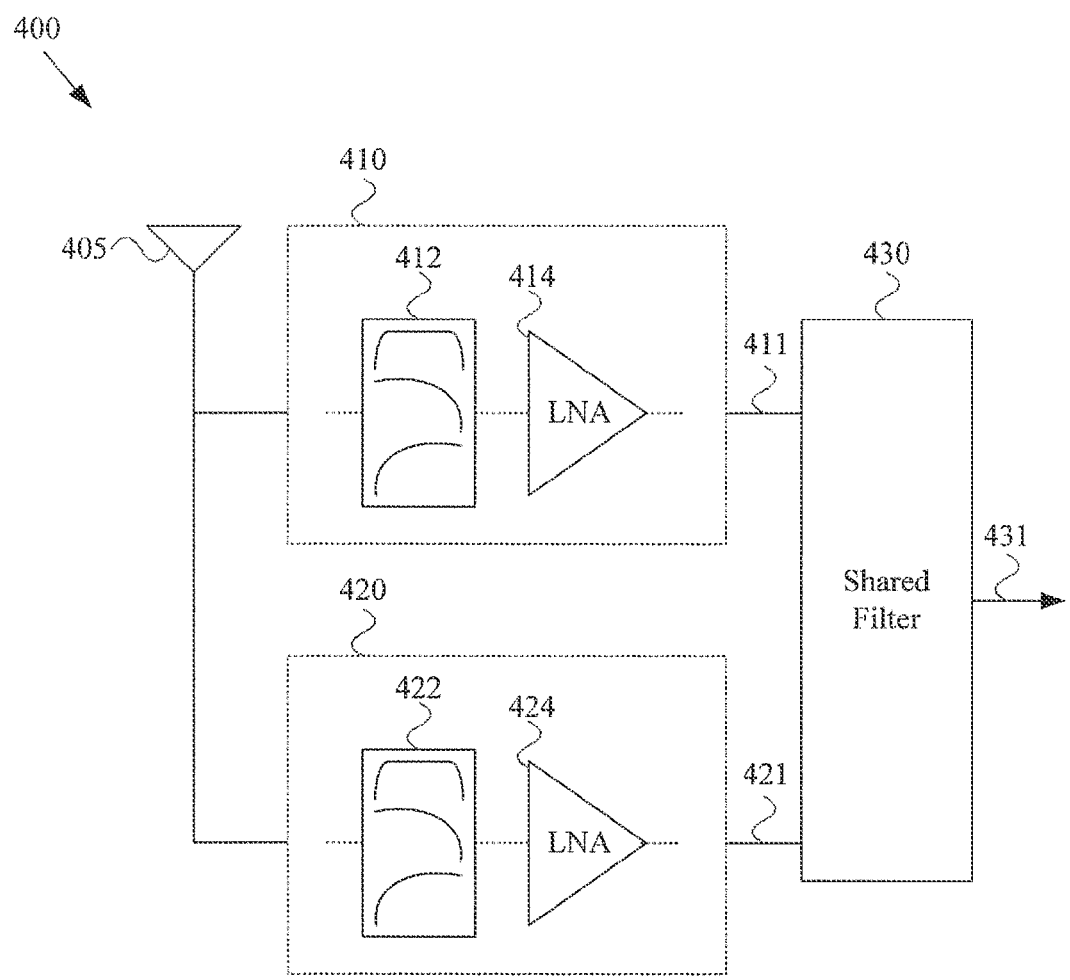
FIG. 4 is a diagram illustrating a portion of a fourth exemplary multimode communication device, in accordance with various aspects of the present invention.

FIG. 4 is a diagram illustrating a portion of a fourth exemplary multimode communication device 400, in accordance with various aspects of the present invention. The exemplary communication device 400 may, for example and without limitation, share any or all characteristics with the exemplary communication devices 100-300 illustrated in FIGS. 1-3 and discussed previously. As discussed previously, a shared filter may be utilized to filter received communication signals at RF frequencies. FIG. 4 illustrates an exemplary configuration utilizing such filtering.

The exemplary communication device 400 comprises a first radio module 410, a second radio module 420 and a shared filter 430. Each of the first and second radio modules 410, 420 may receive a communication signal from at least one antenna 405. For example and without limitation, the first and second radio modules 410, 420 may share any or all characteristics with the first radio modules 110, 210, 310 and second radio modules 120, 220, 320 discussed previously with regard to FIGS. 1-3.

The first radio module 410 may comprise a filter 412 and low noise amplifier 414 to receive an RF communication signal. The first radio module 410 may then output the received RF communication signal 411 to the shared filter 430. The second radio module 420 may comprise a filter 422 and low noise amplifier 424 to receive an RF communication signal. The second radio module 420 may then output the received RF communication signal 421 to the shared filter 430.

The shared filter 430 may then receive and filter the received RF communication signal(s) 411, 421 received from the first and/or second radio modules 410, 420. The shared filter 430 may, for example and without limitation, share any or all characteristics with the shared filters 130, 230, 330 discussed previously with regard to FIGS. 1-3.

Figure 5:
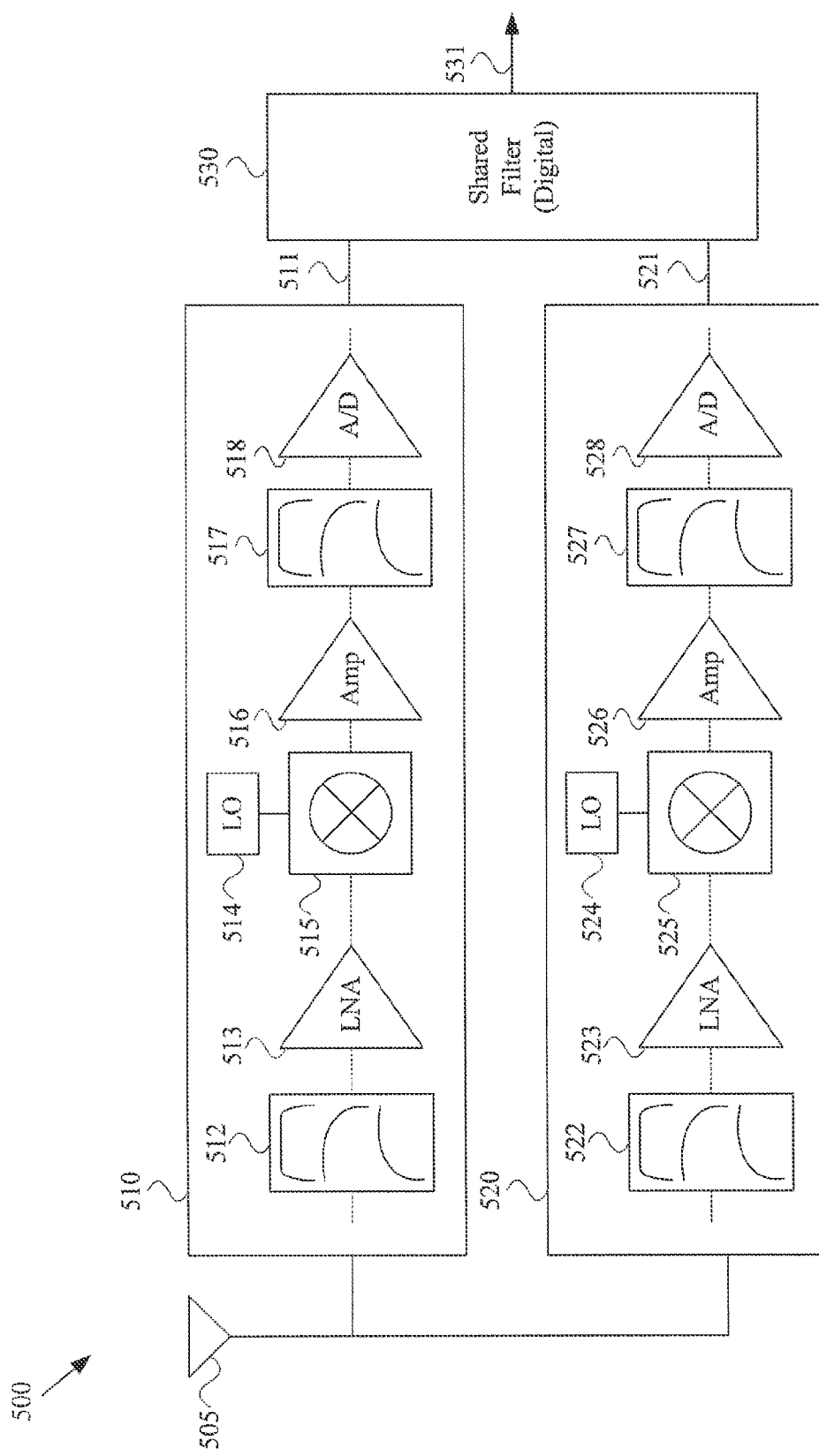
FIG. 5 is a diagram illustrating a portion of a fifth exemplary multimode communication device, in accordance with various aspects of the present invention.

FIG. 5 is a diagram illustrating a portion of a fifth exemplary multimode communication device 500, in accordance with various aspects of the present invention. The exemplary communication device 500 may, for example and without limitation, share any or all characteristics with the exemplary communication devices 100-400 illustrated in FIGS. 1-4 and discussed previously. As discussed previously, a shared filter may comprise characteristics of a digital filter. The exemplary communication device 500 is illustrated in a configuration where the shared filter 530 is a digital filter.

The exemplary communication device 500 comprises a first radio module 510, a second radio module 520 and a shared filter 530. Each of the first and second radio modules 510, 520 may receive a communication signal from at least one antenna 505. For example and without limitation, the first and second radio modules 510, 520 may share any or all characteristics with the first and second radio modules discussed previously with regard to FIGS. 1-4.

The first radio module 510 may comprise a filter 512 and low noise amplifier 513 to receive an RF communication signal. The first radio module 510 may also comprise at least one mixer 515 and at least one local oscillator 514 adapted to convert the received RF communication signal to a baseband communication signal (e.g., directly from RF to baseband or from RF to IF to baseband). The first radio module 510 may also comprise a second filter 517 and an A/D converter 518 to filter and digitize the baseband communication signal. The first radio module 510 may then output the digitized communication signal 511 to the shared digital filter 530.

The second radio module 520 may comprise a filter 522 and low noise amplifier 523 to receive an RF communication signal. The second radio module 520 may also comprise at least one mixer 525 and at least one local oscillator 524 adapted to convert the received RF communication signal to a baseband communication signal (e.g., directly from RF to baseband or from RF to IF to baseband). The second radio module 520 may also comprise a second filter 527 and an A/D converter 528 to filter and digitize the baseband communication signal. The second radio module 520 may then output the digitized communication signal 521 to the shared digital filter 530.

The shared digital filter 530 may then receive and filter the digitized baseband communication signal(s) 511, 521 received from the first and/or second radio modules 510, 520. The shared filter 530 may, for example and without limitation, share any or all characteristics with the shared digital filters discussed previously with regard to FIGS. 1-4.

Figure 6:
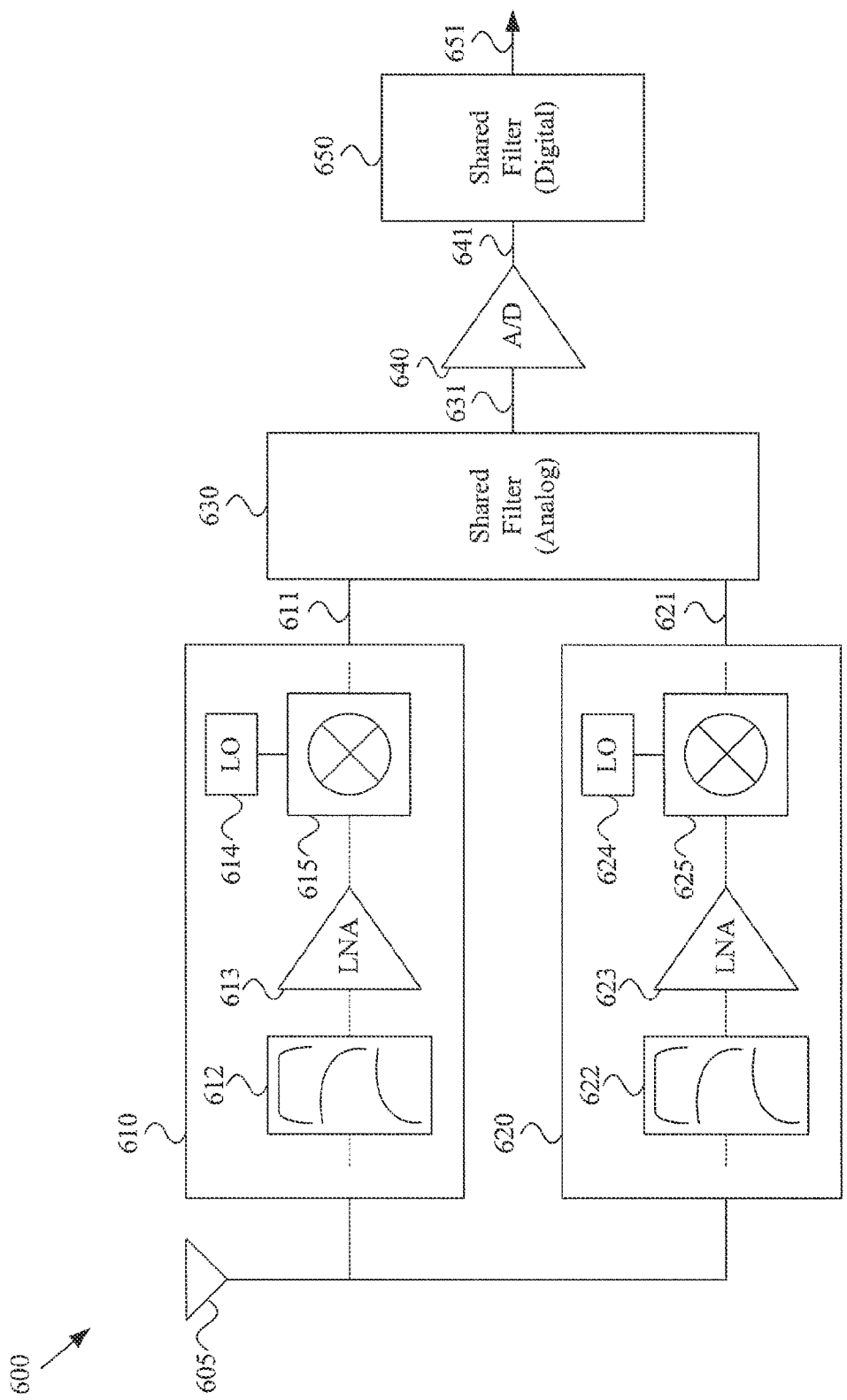
FIG. 6 is a diagram illustrating a portion of a sixth exemplary multimode communication device, in accordance with various aspects of the present invention.

FIG. 6 is a diagram illustrating a portion of a sixth exemplary multimode communication device 600, in accordance with various aspects of the present invention. The exemplary communication device 600 may, for example and without limitation, share any or all characteristics with the exemplary communication devices 100-500 illustrated in FIGS. 1-5 and discussed previously. As discussed previously, a shared filter may comprise characteristics of an analog or digital filter. The exemplary communication device 600 is illustrated in a configuration with two shared filters, namely a shared analog filter 630 and a shared digital filter 650.

The exemplary communication device 600 comprises a first radio module 610, a second radio module 620 and a shared analog filter 630. The exemplary communication device 600 may also comprise an A/D converter 640 and a shared digital filter 650.

Each of the first and second radio modules 610, 620 may receive a communication signal from at least one antenna 605. For example and without limitation, the first and second radio modules 610, 620 may share any or all characteristics with the first and second radio modules discussed previously with regard to FIGS. 1-5.

The first radio module 610 may comprise a filter 612 and low noise amplifier 613 to receive an RF communication signal. The first radio module 610 may also comprise at least one mixer 615 and at least one local oscillator 614 adapted to convert the received RF communication signal to a baseband communication signal (or alternatively, an IF communication signal). The first radio module 610 may then output the baseband communication signal 611 (or IF communication signal) to the shared analog filter 630.

The second radio module 620 may comprise a filter 622 and low noise amplifier 623 to receive an RF communication signal. The second radio module 620 may also comprise at least one mixer 625 and at least one local oscillator 624 adapted to convert the received RF communication signal to a baseband communication signal (or alternatively, an IF communication signal). The second radio module 620 may then output the baseband communication signal 621 (or IF communication signal) to the shared analog filter 630.

The shared analog filter 630 may then receive and filter the baseband communication signal(s) 611, 621 received from the first and/or second radio modules 610, 620 and output the analog-filtered signal 631. The shared analog filter 630 may, for example and without limitation, share any or all analog filter characteristics with the shared filters discussed previously with regard to FIGS. 1-5.

The exemplary communication device 600 may also comprise an A/D converter 640 that receives and digitizes the analog-filtered signal 631 and outputs a digitized communication signal 641. The exemplary communication device 600 may additionally comprise a shared digital filter 650 that receives and filters the digitized communication signal 641 and outputs a digital-filtered communication signal 651. The shared digital filter 650 may, for example and without limitation, share any or all digital filter characteristics with the shared filters discussed previously with regard to FIGS. 1-5.

As discussed previously, radio modules may be communicatively coupled to the shared filter through various intermediate components (e.g., switches, signal combining circuitry, multiplexers, variable gain amplifiers, etc.). FIGS. 7-9 present various non-limiting exemplary multimode communication device configurations utilizing such intermediate components.

FIG. 7 is a diagram illustrating a portion of a seventh exemplary multimode communication device 700, in accordance with various aspects of the present invention. The exemplary communication device 700 may, for example and without limitation, share any or all characteristics with the exemplary communication devices 100-600 illustrated in FIGS. 1-6 and discussed previously.

The exemplary communication device 700 may comprise a first radio module 710, a second radio module 720 and a shared filter 730. The first and second radio modules 710, 720 and shared filter 730 may, for example and without limitation, share any or all characteristics with the first and second radio modules and shared filters discussed previously with regard to FIGS. 1-6.

The first radio module 710 may output a first received communication signal 711, and the second radio module 720 may output a second received communication signal 721. A switching module 760 (e.g., comprising a switching device 762) may receive the first received communication signal 711 and/or the second received communication signal 721 and output a selected communication signal 761. Operation of the switching device 762 (e.g., a switch, array of switches or multiplexer) may be controlled in any of a variety of manners, some of which were discussed previously with regard to the filter control module 132 of the exemplary communication device 100 illustrated in FIG. 1.

The shared filter 730 may then filter the selected communication signal 761 in accordance with a selected one of a plurality of selectable sets of filter response characteristics and output a filtered communication signal 731.

FIG. 8 is a diagram illustrating a portion of an eighth exemplary multimode communication device 800, in accordance with various aspects of the present invention. The exemplary communication device 800 may, for example and without limitation, share any or all characteristics with the exemplary communication devices 100-700 illustrated in FIGS. 1-7 and discussed previously.

The exemplary communication device 800 may comprise a first radio module 810, a second radio module 820 and a shared filter 830. The first and second radio modules 810, 820 and shared filter 830 may, for example and without limitation, share any or all characteristics with first and second radio modules and shared filters discussed previously with regard to FIGS. 1-7.

The first radio module 810 may output a first received communication signal 811, and the second radio module 820 may output a second received communication signal 821. A switching module 860 may receive the first received communication signal 811 and/or the second received communication signal 821 and output a selected (or combined) communication signal 861. For example, the switching module 860 may comprise a first switching device 862 that controls communication of the first received communication signal 811 to a summing circuit 864. The switching module 860 may also comprise a second switching device 863 that controls communication of the second received communication signal 821 to the summing circuit 864.

Operation of the switching devices 862, 863 may be controlled in any of a variety of manners, some of which were discussed previously with regard to the filter control module 132 of the exemplary communication device 100 illustrated in FIG. 1. For example, the switching devices 862, 863 may be controlled to apply either the first received communication signal 811 or the second received communication signal 821 to the summing circuit 864. Also, in various exemplary scenarios (e.g., where the filter 830 may simultaneously filter a plurality of communication signals), the switching devices 862, 863 may be controlled to apply both the first and second received communication signals 811, 821 to the summing circuit 864.

The shared filter 830 may then filter the selected communication signal 861 in accordance with a selected one of a plurality of selectable sets of filter response characteristics and output a filtered communication signal 831.

FIG. 9 is a diagram illustrating a portion of a ninth exemplary multimode communication device, in accordance with various aspects of the present invention. The exemplary communication device 900 may, for example and without limitation, share any or all characteristics with the exemplary communication devices 100-800 illustrated in FIGS. 1-8 and discussed previously.

The exemplary communication device 900 may comprise a first radio module 910, a second radio module 920 and a shared filter 930. The first and second radio modules 910, 920 and shared filter 930 may, for example and without limitation, share any or all characteristics with the first and second radio modules and shared filters discussed previously with regard to FIGS. 1-8.

The first radio module 910 may output a first received communication signal 911, and the second radio module 920 may output a second received communication signal 921. A switching module 960 may receive the first received communication signal 911 and/or the second received communication signal 921 and output a selected (or combined) communication signal 961. For example, the switching module 960 may comprise a first variable gain device 962 (e.g., a variable amplifier) that controls communication of the first received communication signal 911 to a summing circuit 964. The switching module 960 may also comprise a second variable gain device 963 (e.g., a variable amplifier) that controls communication of the second received communication signal 921 to the summing circuit 964.

Operation of the variable gain devices 962, 963 may be controlled in any of a variety of manners, some of which were discussed previously with regard to the filter control module 132 of the exemplary communication device 100 illustrated in FIG. 1. For example, the variable gain devices 962, 963 may be controlled to apply either the first received communication signal 911 or the second received communication signal 921 to the summing circuit 964. Also, in various exemplary scenarios (e.g., where the filter 930 may simultaneously filter a plurality of communication signals), the variable gain devices 962, 963 may be controlled to apply both the first and second received communication signals 911, 921 to the summing circuit 964 (e.g., in balanced or unbalanced proportion).

The shared filter 930 may then filter the selected communication signal 961 in accordance with a selected one of a plurality of selectable sets of filter response characteristics and output a filtered communication signal 931.

The exemplary multimode communication devices 100-900 illustrated in FIGS. 1-9 and discussed previously were presented by discussing various functional modules. Such modular presentation was chosen for illustrative clarity and should not limit the scope of various aspects of the present invention. For example, as discussed previously, various modules may be implemented in hardware and/or software, and various modules may share hardware and/or software components. Additionally, various modules may be implemented in any of a variety of degrees of integration. For example and without limitation, the radio modules, filter modules and other modules discussed herein may be integrated into a single integrated circuit, implemented in separate ICs, in a multi-chip module or circuit board. Accordingly, the scope of various aspects of the present invention should not be limited by characteristics of particular hardware and/or software implementations, by arbitrary boundaries between modules, or by any particular degree of integration.

Figure 10:
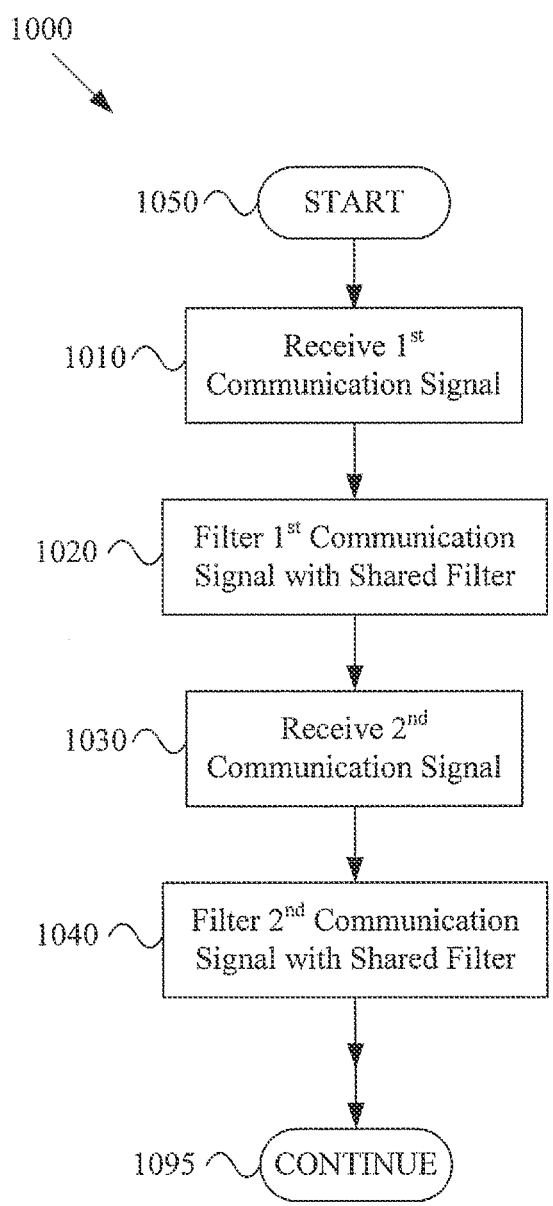
FIG. 10 is a diagram illustrating an exemplary method, in a multimode communication device, for processing communication signals, in accordance with various aspects of the present invention.

FIG. 10 is a diagram illustrating an exemplary method 1000, in a multimode communication device, for processing communication signals, in accordance with various aspects of the present invention. The exemplary method 1000 may, for example and without limitation, share any or all functional characteristics with the exemplary multimode communication devices 100-900 illustrated in FIGS. 1-9 and discussed previously.

The exemplary method 1000 may begin executing at step 1005. The exemplary method 1000 (and all methods discussed herein) may begin executing for any of a variety of reasons. For example and without limitation, the exemplary method 1000 may begin executing in response to a command to begin (e.g., received by a user or another communication device). Also for example, the exemplary method 1000 may begin executing in response to arrival or detection of a communication signal. Further for example, the exemplary method 1000 may begin executing in response to a predetermined operating profile or sequence.

The exemplary method 1000 may, at step 1010, comprise receiving a first communication signal (e.g., corresponding to a first communication protocol). Step 1010 may, for example and without limitation, share any or all functional characteristics with the exemplary first radio modules 110-910 illustrated in FIGS. 1-9 and discussed previously.

The exemplary method 1000 may, at step 1020, comprise filtering the first communication signal with a shared filter. Step 1020 may, for example and without limitation, share various functional characteristics with the exemplary shared filters 130-930 and 960 illustrated in FIGS. 1-9 and discussed previously. For example, in an exemplary scenario where the first communication signal received at step 1010 corresponds to a first communication protocol, step 1020 may comprise filtering the received first communication signal in accordance with the first communication protocol. For example, step 1020 may comprise filtering the received first communication signal in accordance with a selected set of filter response characteristics of a plurality of sets of selectable filter response characteristics, where the selected set of filter response characteristics corresponds to the first communication protocol.

Step 1020 may comprise filtering the first communication signal with a shared filter in any of a variety of manners, some of which were discussed previously. For example, step 1020 may comprise programming (or adjusting) the shared filter to filter the received first communication signal in accordance with a first set of filter response characteristics (e.g., associated with a first communication protocol). For example and without limitation, step 1020 may comprise programming the shared filter by configuring a switching array or setting tap coefficient values and/or filter configuration.

In a non-limiting exemplary scenario, steps 1010 and 1020 may comprise receiving and filtering a first communication signal through a first communication signal pathway of the multimode communication device, where the first communication signal pathway comprises the shared filter.

The exemplary method 1000 may, at step 1030, comprise receiving a second communication signal (e.g., corresponding to a second communication protocol). Step 1030 may, for example and without limitation, share any or all functional characteristics with the exemplary second radio modules 120-920 illustrated in FIGS. 1-9 and discussed previously.

The exemplary method 1000 may, at step 1040, comprise filtering the second communication signal with a shared filter. Step 1040 may, for example and without limitation, share various functional characteristics with the exemplary shared filters 130-930 and 960 illustrated in FIGS. 1-9 and discussed previously. For example, in an exemplary scenario where the second communication signal received at step 1030 corresponds to a second communication protocol, step 1040 may comprise filtering the received second communication signal in accordance with the second communication protocol. For example, step 1040 may comprise filtering the received second communication signal in accordance with a selected set of filter response characteristics of a plurality of selectable sets of filter response characteristics, where the selected set of filter response characteristics corresponds to the second communication protocol.

Step 1040 may comprise filtering the second communication signal with the shared filter in any of a variety of manners, some of which were discussed previously. For example, step 1040 may comprise programming (or adjusting) the shared filter to filter the received second communication signal in accordance with a second set of filter response characteristics (e.g., associated with a second communication protocol). For example and without limitation, step 1040 may comprise programming the shared filter by configuring a switching array or setting tap coefficient values and/or filter configuration.

In a non-limiting exemplary scenario, steps 1030 and 1040 may comprise receiving and filtering a second communication signal through a second communication signal pathway (e.g., at least a portion of which is different from the first communication signal pathway) of the multimode communication device, where the second communication signal pathway comprises the shared filter.

The exemplary method 1000 may, at step 1095, comprise performing continued communication signal processing. Such continued communication signal processing may comprise characteristics of any of a variety of types of communication signal processing. For example and without limitation, step 1095 may comprise looping execution flow of the exemplary method 1000 back up to step 1010 or 1030 for continued reception and processing of communication signals. Also for example, step 1095 may comprise performing symbol detection, decoding, decrypting or error correcting activities with a received communication signal. Additionally, for example, step 1095 may comprise transmitting information. Further for example, step 1095 may comprise performing user interface activities.

The exemplary method 1000 was presented to provide specific non-limiting examples of various generally broader aspects of the present invention. Accordingly, the scope of various aspects of the present invention should not be limited by specific characteristics of the exemplary method 1000.

The exemplary method 1000 illustrated sequentially (e.g., serially) receiving and filtering a first and second communication signal. Note, however, that various aspects of the present invention are readily extensible to concurrent reception of a plurality of communication signals. For example, in various scenarios, filtering may also be performed concurrently (e.g., where two combined communication signals share a filtered frequency band). A non-limiting example of a scenario involving concurrent reception and/or filtering is illustrated in FIG. 11.

Figure 11:
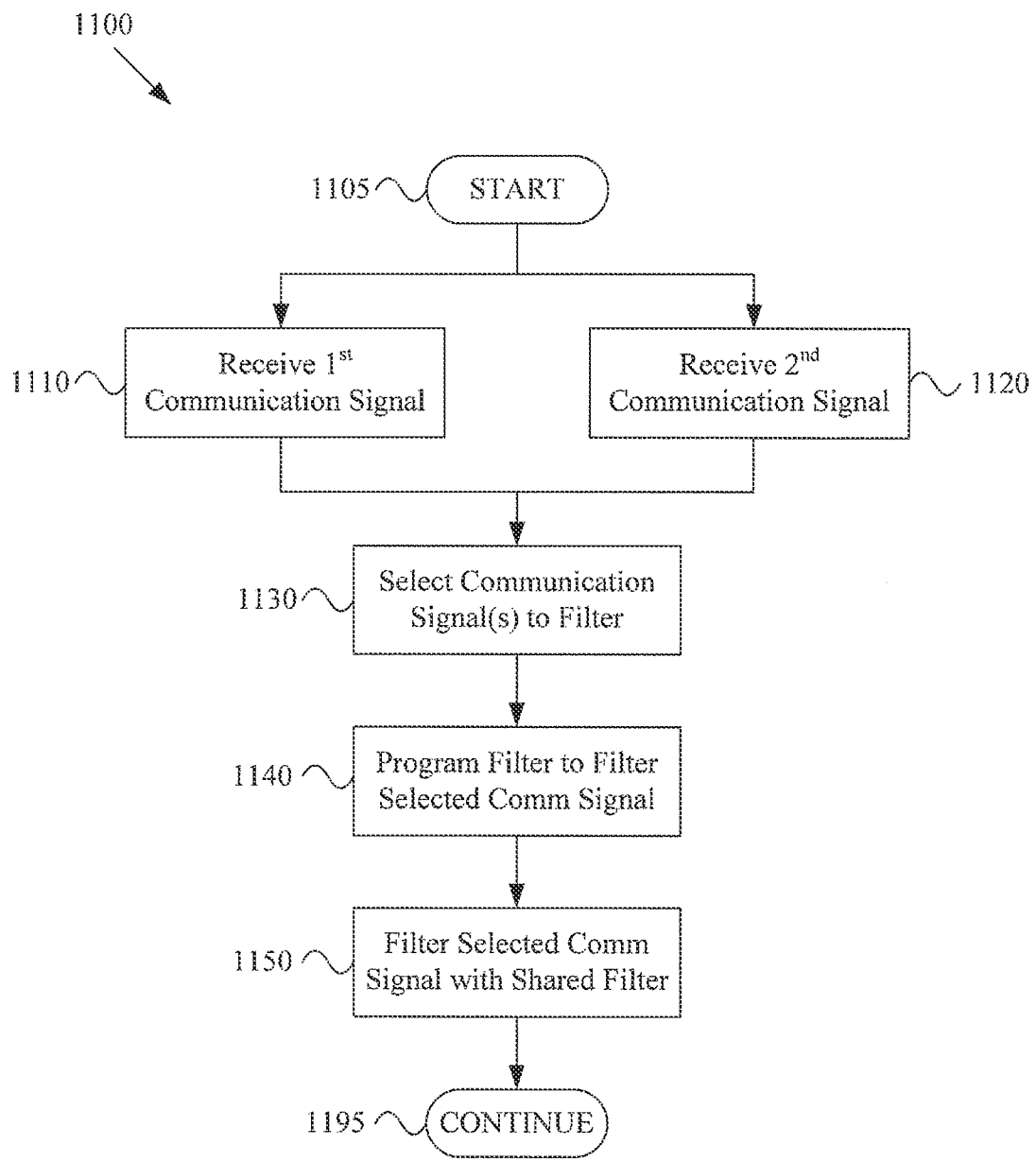
FIG. 11 is a diagram illustrating an exemplary method, in a multimode communication device, for processing communication signals, in accordance with various aspects of the present invention.

FIG. 11 is a diagram illustrating an exemplary method 1100, in a multimode communication device, for processing communication signals, in accordance with various aspects of the present invention.

The exemplary method 1100 may, at step 1110, comprise receiving a first communication signal (e.g., corresponding to a first communication protocol). Step 1110 may, for example and without limitation, share any or all characteristics with step 1010 of the exemplary method 1000 illustrated in FIG. 10 and discussed previously.

The exemplary method 1100 may, at step 1120, comprise receiving a second communication signal (e.g., corresponding to a second communication protocol). Step 1120 may, for example and without limitation, share any or all characteristics with step 1030 of the exemplary method 1000 illustrated in FIG. 10 and discussed previously. Step 1120 may, for example, comprise receiving the second communication signal concurrently with step 1110 receiving the first communication signal.

The exemplary method 1100 may, at step 1130, comprise selecting a communication signal (e.g., of the first communication signal received at step 1110 and the second communication signal received at step 1120) to filter. Step 1130 may, for example and without limitation, share any or all functional characteristics with the filter control module 132 discussed previously with regard to FIG. 1. Also, step 1130 may, for example and without limitation, share various functional characteristics with the switching modules 760, 860, 960 illustrated in FIGS. 7-9. Step 1130 may, for example, comprise selecting a communication signal based, at least in part, on user input, a predetermined operating profile, signal strength, current communication needs, etc.

Step 1130 may, for example, comprise selecting one of the first communication signal received at step 1110 and the second communication signal received at step 1120. Alternatively, in various exemplary scenarios, step 1130 may comprise selecting a plurality of received communication signals for concurrent filtering. For example and without limitation, step 1130 may comprise selecting to filter the first and second received communication signals (e.g., where the first and second signals are combined into a single communication signal).

The exemplary method 1100 may, at step 1140, comprise programming (or adjusting) a shared filter to filter the selected communication signal (e.g., selected at step 1130) in accordance with a selected set of filter response characteristics. Such a selected set of filter response characteristics may, for example, correspond to the selected communication signal(s). Step 1140 may, for example and without limitation, share any or all characteristics with steps 1020 and 1040 of the exemplary method 1000 illustrated in FIG. 10 and discussed previously. For example, step 1140 may comprise setting switch configurations, tuning passive components, setting filter tap coefficients, setting filter configuration, etc.

The exemplary method 1100 may, at step 1150, comprise filtering the selected communication signal (e.g., as selected at step 1130) in accordance with the programming (or adjusting) of the shared filter performed at step 1140. Step 1150 may, for example and without limitation, share any or all characteristics with steps 1020 and 1040 of the exemplary method 1000 illustrated in FIG. 10 and discussed previously.

The exemplary method 1100 was presented to provide specific non-limiting examples of various generally broader aspects of the present invention. Accordingly, the scope of various aspects of the present invention should not be limited by specific characteristics of the exemplary method 1100.

In summary, various aspects of the present invention provide a multimode communication device with a shared signal path programmable filter and a method for utilizing a shared signal path programmable filter in a multimode communication device. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A multimode communication device comprising:
   a first module adapted to receive a first communication signal corresponding to a first communication protocol;
   a second module adapted to receive a second communication signal corresponding to a second communication protocol that is different from the first communication protocol; and
   a filter, communicatively coupled to the first and second modules, adapted to filter a communication signal received from the first and second modules, wherein the filter is selectively operable between a first mode and a second mode, in the first mode the filter has a first filter response characteristic corresponding to the first communication protocol, and in the second mode the filter has a second filter response characteristic corresponding to the second communication protocol; and
   a signal-combining module adapted to combine the first communication signal and the second communication signal and to provide a combined communication signal to the filter.

2. The multimode communication device of claim 1, further comprising at least one module adapted to:
   select one of a plurality of selectable sets of filter response characteristics; and
   direct the filter to filter the combined communication signal in accordance with the selected set of filter response characteristics.

3. The multimode communication device of claim 2, wherein the at least one module is adapted to select one of the first filter response characteristic and the second filter response characteristic based, at least in part, on an indication that one of the first communication signal and the second communication signal corresponds to one of the first communication protocol and the second communication protocol.

4. The multimode communication device of claim 1, wherein the first and second communication protocols are wireless computer network communication protocols.

5. The multimode communication device of claim 1, wherein the first and second modules are adapted to receive communication signals in overlapping frequency bands.

6. The multimode communication device of claim 1, wherein the first and second modules are adapted to share at least a portion of their components.

7. The multimode communication device of claim 1, further comprising a switching module adapted to select between the first communication signal and the second communication signal and provide one of the first communication signal and the second communication signal to the filter.

8. The multimode communication device of claim 1, wherein:
   the filter comprises a switched array of passive components;
   a first switch configuration corresponds to the first filter response characteristic; and
   a second switch configuration corresponds to the second filter response characteristic.

9. The multimode communication device of claim 1, further comprising a memory operable to store setting information for the filter.

10. The multimode communication device of claim 1, wherein the filter is an analog filter.

11. The multimode communication device of claim 1, wherein the filter is a digital filter.

12. The multimode communication device of claim 11, wherein the filter comprises a plurality of taps with programmable tap coefficients.

13. The multimode communication device of claim 1, wherein:
   the first filter response characteristic comprises a first center frequency; and
   the second filter response characteristic comprises a second center frequency different from the first center frequency.

14. The multimode communication device of claim 1, wherein:
   the first filter response characteristic comprises a first bandwidth; and the second filter response characteristic comprises a second bandwidth different from the first bandwidth.

15. The multimode communication device of claim 1, wherein:
the first filter response characteristic comprises a first cutoff frequency; and
the second filter response characteristic comprises a second cutoff frequency different from the first cutoff frequency.

16. The multimode communication device of claim 1, wherein the filter is adapted to filter a communication signal received from at least one of the first and second modules at intermediate frequency (IF) frequencies.

17. The multimode communication device of claim 1, wherein the filter is adapted to filter a communication signal received from at least one of the first and second modules at radio frequency (RF) frequencies.

18. The multimode communication device of claim 1, wherein the multimode communication device is a mobile communication device.

19. A multimode communication device comprising:
a first communication signal pathway through which communication signals corresponding to a first communication protocol are received and processed; and
a second communication signal pathway, at least a portion of which is different from the first communication signal pathway, through which communication signals corresponding to a second communication protocol, different from the first communication protocol, are received and processed, wherein:
the first and second communication signal pathways comprise a shared filter and a signal-combining module;
the shared filter is adapted to filter a communication signal according to a selected one of a first filter response characteristic and a second filter response characteristic; and
the signal-combining module is adapted to combine the communication signals corresponding to the first communication protocol and the communication signals corresponding to the second communication protocol and is further adapted to provide a combined communication signals to the shared filter.

20. The multimode communication device of claim 19, wherein the shared filter is adapted to:
when processing a communication signal associated with the first communication signal pathway, filter the communication signal associated with the first communication signal pathway in accordance with filter response characteristics associated with the first communication protocol; and
when processing a communication signal associated with the second communication signal pathway, filter the communication signal associated with the second communication signal pathway in accordance with filter response characteristics associated with the second communication protocol.

21. The multimode communication device of claim 19, wherein the shared filter is adapted to, when processing a communication signal associated with the first and second communication signal pathways, filter the communication signal associated with the first and second communication signal pathways in accordance with filter response characteristics associated with the first and second communication protocols.

22. The multimode communication device of claim 19, wherein:
the first communication signal pathway comprises a first radio module adapted to receive a radio frequency (RF) signal corresponding to the first communication protocol; and
the second communication signal pathway comprises a second radio module, at least a portion of which is independent of the first radio module, adapted to receive an RF signal corresponding to the second communication protocol.

23. The multimode communication device of claim 19, wherein the first and second communication protocols correspond to wireless computer network communication protocols.

24. The multimode communication device of claim 19, wherein the shared filter is adapted to filter the communication signal at intermediate frequency (IF) frequencies.

25. A method comprising:
receiving a first communication signal corresponding to a first communication protocol;
receiving a second communication signal corresponding to a second communication protocol that is different from the first communication protocol;
combining the first communication signal and the second communication signal to provide a combined communication signal; and
filtering the combined communication signal according to a selected one of a first filter response characteristic associated with the first communication protocol and a second filter response characteristic associated with the second communication protocol.

26. The method of claim 25, further comprising selecting one of the first filter response characteristic associated with the first communication protocol and the second filter response characteristic associated with the second communication protocol at run-time.

* * * * *